US011514781B2

(12) United States Patent
Trim et al.

(10) Patent No.: US 11,514,781 B2
(45) Date of Patent: Nov. 29, 2022

(54) GENERATING DYNAMIC ELECTROCHROMIC VISUALIZATIONS

(71) Applicant: International Business Machines Corporation, Armonk, NY (US)

(72) Inventors: Craig M. Trim, Ventura, CA (US); Rashida A. Hodge, San Francisco, CA (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 17/176,210

(22) Filed: Feb. 16, 2021

(65) Prior Publication Data

US 2022/0262243 A1 Aug. 18, 2022

(51) Int. Cl.
*G08G 1/07* (2006.01)
*G02F 1/163* (2006.01)
*H04L 67/12* (2022.01)

(52) U.S. Cl.
CPC ............. *G08G 1/07* (2013.01); *G02F 1/163* (2013.01); *H04L 67/12* (2013.01)

(58) Field of Classification Search
CPC .......... G08G 1/07; G08G 1/081; G08G 1/082; G08G 1/083; G08G 1/085; G08G 1/087; G08G 1/075; G08G 1/08; G02F 1/163; G02F 2001/1635; H04L 67/12; H04L 67/125
See application file for complete search history.

(56) References Cited

U.S. PATENT DOCUMENTS

| 7,021,857 B2 | 4/2006 | Van Der Poel |
| 10,562,452 B2 | 2/2020 | Herrmann |
| 2015/0219463 A1* | 8/2015 | Kang ............... G08G 1/096844 340/932.2 |
| 2016/0132705 A1* | 5/2016 | Kovarik ............ G06K 7/10376 340/10.3 |

(Continued)

FOREIGN PATENT DOCUMENTS

| CN | 106874597 B | 12/2019 |
| WO | 2017058459 A1 | 4/2017 |
| WO | 2017065898 A1 | 4/2017 |

OTHER PUBLICATIONS

Basjaruddin et al., "Overtaking Assistant System Based on Fuzzy Logic", TELKOMNIKA, vol. 13, No. 1, Mar. 2015, DOI: 10.12928/TELKOMNIKA.v13i1.499, 9 pages.

(Continued)

*Primary Examiner* — Sisay Yacob
(74) *Attorney, Agent, or Firm* — Brian M. Restauro

(57) ABSTRACT

Embodiments of the present invention provide methods, computer program products, and systems. Embodiments of the present invention can allocate a dedicated traffic channel to a plurality of connected devices. Embodiments of the present invention can dynamically determine an appropriate visualization for one or more connected devices of the plurality of connected devices based on received information. Embodiments of the present invention render the dynamically determined appropriate visualization for the one or more connected devices of the plurality of connected devices using the dedicated traffic channel.

20 Claims, 6 Drawing Sheets

(56) References Cited

U.S. PATENT DOCUMENTS

2017/0270413 A1* 9/2017 Moreira-Matias ... G08G 1/0175
2018/0120857 A1* 5/2018 Kappauf ............... G01S 17/931
2020/0152059 A1* 5/2020 Cohen ................ G01C 21/3691

OTHER PUBLICATIONS

Han et al., "Context-Awareness Enhances 5G Multi-Access Edge Computing Reliability", arXiv:1712.00234v5 [cs.NI] Feb. 2019, 11 pages.

Haring et al., "A Cognitive Model of Drivers Attention", Uploaded Oct. 7, 2020, 6 pages.

Disclosed Anonymously et al., "Method and Apparatus of On-Road Social Network for Enhancing Road Safety and Awareness", An IP.com Prior Art Database Technical Disclosure, IP.com No. IPCOM000239365D, IP.com Electronic Publication Date: Nov. 3, 2014, 10 pages.

Disclosed Anonymously et al., "Method and System for Enabling Distributed Speed Control of Vehicles in 5G Networks", An IP.com Prior Art Database Technical Disclosure, IP.com No. IPCOM000256218D, IP.com Electronic Publication Date: Nov. 13, 2018, 4 pages.

Disclosed Anonymously et al., "A crowdsourcing method to generate road segment safety ratings based on localised behaviour of agents on the road network", An IP.com Prior Art Database Technical Disclosure, IP.com No. IPCOM000257375D, IP.com Electronic Publication Date: Feb. 6, 2019, 3 pages.

Kaleem et al., "PS-CARA: Context-Aware Resource Allocation Scheme for Mobile Public Safety Networks", Published: May 8, 2018, 17 pages.

Kryszkiewicz et al., "Context-Based Spectrum Sharing in 5G Wireless Networks Based on Radio Environment Maps", Published Nov. 11, 2018, Copyright © 2018 Pawel Kryszkiewicz et al., https://doi.org/10.1155/2018/3217315, 16 pages.

Mortimer, Roger, "Switching Colors with Electricity", Jan.-Feb. 2013, vol. 101, No. 1, DOI: 10..1511/2013.100.38, 37 pages.

Sangani, Priyanka, "Honda Cars partners with IBM Watson to enhance 'Honda Connect'", Last Updated: May 29, 2017, 3 pages, <https://economictimes.indiatimes.com/honda-cars-partners-with-ibm-watson-to-enhance-honda-connect/articleshow/58885427.cms?from=mdr>.

Subramaniyam et al., "A Survey on IoT Based Intelligent Road Traffic and Transport Management Systems", vol. 5, Issue 12, Dec. 2017, 3 pages.

Mao et al., "Design of Real-Time Dynamic Reversible Lane in Intelligent Cooperative Vehicle Infrastructure System", Hindawi, Journal of Advanced Transportation, vol. 2020, Article ID 8838896, 8 pages, <https://doi.org/10.1155/2020/8838896>.

* cited by examiner

GENERATING DYNAMIC ELECTROCHROMIC VISUALIZATIONS

BACKGROUND

The present invention relates in general to telecommunications networking and Internet of Things (IoT) devices and in particular to generating dynamic electrochromic visualizations for road use.

Advanced telecommunications networks, including 5G networks, offer certain features that are far more sophisticated and flexible than predecessor technologies. For example, 4G networks offer trilateration capabilities that allow a carrier to locate a user's position within about a hundred feet by comparing signals from multiple cell towers. 5G and later networks, however, can trilaterate a device's location with at least one order-of-magnitude greater precision, allowing a user's position to be identified within a range of tens of feet.

5G and similar networks can also handle far more simultaneous connections, making them more practical for Internet of Things applications, which can associate numerous IoT sensor devices with a single user. Such networks can also open high-bandwidth ad hoc channels that exhibit very low latency, allowing large groups of users to connect and disconnect at will in a dynamic mesh network. In addition, these networks can integrate artificially intelligent or cognitive applications directly into their network infrastructure, rather than requiring such functionality to be implemented as extrinsic services hosted by a cloud-computing service or other third-party resource.

5G networks enable the mass deployment of IoT devices by providing the ability to dynamically manage very large numbers of devices on ad hoc mesh networks. If, for example, a thousand people watching a parade are each carrying an average of five IoT devices, a legacy Internet Service Provider (ISP) would likely be unable to simultaneously manage and correlate the resulting large number of connections. The flexible service-orchestration capabilities of a 5G network, on the other hand, after detecting the presence of a mass assembly, allow the network to dynamically create an ad hoc mesh network that continuously adds and removes users as IoT devices log in and log out. Unlike legacy networks, which would require an extrinsic application, such as a hosted cloud service, to even approximate such features, 5G platforms support such high-speed ad hoc infrastructure through integrated, native orchestration services.

Smart traffic signs (e.g., lights, road markers, etc.) combine traditional traffic lights with an array of sensors and artificial intelligence to intelligently route vehicle and pedestrian traffic. Unlike other dynamic control signals that adjust the timing and phasing of lights according to limits that are set in controller programming, these smart traffic sings combine existing technology with artificial intelligence. In other words, these systems adapt to information that is received from a central computer about the position, speed and direction of vehicles and communicate with cars to alert drivers of impending light changes and reduce motorists' waiting time considerably.

An electrochromic device (ECD) controls optical properties such as optical transmission, absorption, reflectance and/or emittance in a continual but reversible manner on application of voltage (e.g., electrochromism). This property enables an ECD to be used for applications like smart glass, electrochromic mirrors, and electrochromic display devices. As the color change is persistent and energy need only be applied to effect a change, electrochromic materials are used to control the amount of light and heat allowed to pass through a surface.

SUMMARY

According to an aspect of the present invention, there is provided a computer-implemented method. The method comprises allocating a dedicated traffic channel to a plurality of connected devices; dynamically determining an appropriate visualization for one or more connected devices of the plurality of connected devices based on received information; and rendering the dynamically determined appropriate visualization for the one or more connected devices of the plurality of connected devices using the dedicated traffic channel.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize principles of elecrochromism. For example, embodiments of the present invention recognize that small electronic circuitry can be attached to materials (e.g., a film, paint, or any other known medium, etc.), and with appropriate voltage, change color properties of the material. Embodiments of the present invention further recognize changes in driving dynamics with the advent of autonomous vehicles, smart lights, and smart roads (e.g., roads embedded with various sensors) would require solutions to monitor information received from various sensors of those respective autonomous vehicles, lights, and roads.

Embodiments of the present invention further recognize that traditional markings (e.g., road markings such as signs, lane markers, etc.) are static, that is, the signs are fixed and cannot be dynamically changed based on received information from the various sensors. As such, embodiments of the present invention recognize that traditional road markings lack mechanisms that can provide an aspect of cognition enablement in the roads sensors that can convey dynamic information for autonomous vehicles, their users, and other motorists. For example, embodiments of the present invention can dynamically alter road markers that would allow for safer overtaking for an area by altering road markings to indicate it would be safe to perform an overtaking maneuver and subsequently change the road markings back (e.g., to a double solid yellow) when conditions are not safe for overtaking maneuvers.

Stated another way, embodiments of the present invention further recognize there is no mechanism today that can use electrochromic paints to program the road-lines and surface markings for giving the appropriate dynamic message to the drivers. These road surface markings are static, that is, they remain the same during all the situations and cannot divert or direct users based on dynamically received information that would direct users to slow down (e.g., in the event of an accident) or allow users to perform safer overtaking maneuvers.

As such, embodiments of the present invention provide solutions that make traditional road markings dynamic. Specifically, embodiments of the present invention can dynamically change road surface markings based on contextual information as discussed in greater detail later in the Specification. For example, embodiments of the present invention provide a mechanism for autonomous control the road surface marking lines based on dynamic situations detected by a cognition enabled service running in service orchestration layer of 5G telecom network. The service detects for various static and dynamic parameters and instructs the electrochromic color changing strip lines on the road to change their meanings. As such, embodiments of the present invention can improve driving dynamics and enable dynamic road markings that were previously unavailable.

Figure 1:
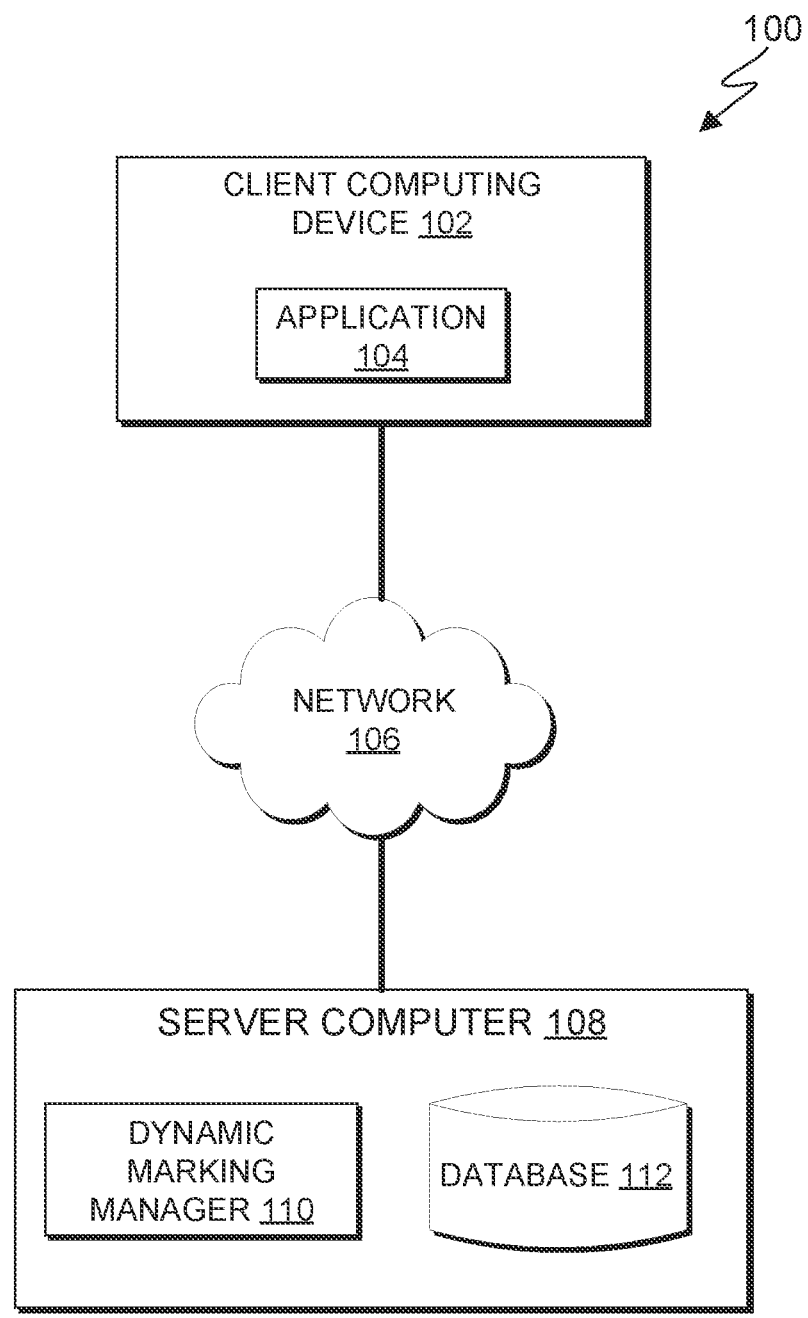
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access dynamic marking manager 110 (e.g., using TCP/IP) to access content, user information, and database information. Application 104 can further communicate with dynamic marking manager 110 to transmit instructions to dynamically change road surface markings based on contextual information running in service orchestration layer of 5G telecom network as discussed in greater detail with regard to FIGS. 2-5.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts dynamic marking manager 110 and database 112. In this embodiment, dynamic marking manager 110 resides on server computer 108. In other embodiments, dynamic marking manager 110 can have an instance of the program (not shown) stored locally on client computer device 102. In other embodiments, dynamic marking manager 110 can be a standalone program or system that dynamically changes road surface markings based on contextual information. In yet other embodiments, dynamic marking manager 110 can be stored on any number or computing devices. For example, dynamic marking manager 110 can be incorporated into a cognition enabled CPU core clock changing service.

Dynamic marking manager 110 works in the service orchestration layer of a 5G telecom network and provides a dedicated logical channel for the data collection from one or more automobile locations and physical discovery services in the orchestrator domain. Dynamic marking manager 110 can also connect with multiple electronic Internet of Things (IoT) devices on the road. In this embodiment, dynamic marking manager 110 can collect information from a vehicle location management service in the 5G service orchestration layer using in-bond or out-of-bound protocols across the services and can collect the location map of all the automobile devices on the area. In this embodiment, dynamic marking manager 110 can collect information using direct DTCH connection to the vehicles and locate the base eNodeB map or the existing services can be adapted to query the location maps using MAC based inter-service access in 5G network.

Dynamic marking manager 110 can then transmit instructions to the Physical Network Function (PNF) to collect and identify electrochromic sensors placed on roads (incorporated within road markings) within the previously collected maps. Dynamic marking manager 110 can the identify and collect these electrochromic sensor-based road lines using the Physical Network function of 5G telecom network using light weight DTCH that are allocated to the road-line electrochromic devices. In this embodiment, dynamic marking manger 110 issues a Dedicated Traffic Channel (DTCH)

that has a low bandwidth communication channel allocated over Radio bearers and uses MAC to transfer the control instructions to the device form service orchestration layer. In this manner, dynamic marking manager 110 can collect physical location of the road-marking electrochromic devices from the PNF and can then transmit the collected information service orchestration layer of 5G network.

In this embodiment, an instance of dynamic marking manager 110 can be in the orchestration plane. In this embodiment, dynamic marking manager 110 collects domain level static and dynamic computing resources. Dynamic marking manager 110 can use these resources to identify current road conditions including driving conditions of the road, nature of the road, current road-line status, vehicles from opposite sides, road situation ahead, users, etc.

Dynamic marking manager 110 can then instruct an electrochromic paint controller of road-lines to tune the color and opacity based on the insights collected autonomously. Dynamic marking manager 110 can then collect information form audio-visual devices placed on the vehicle and the electrochromic device sensors. Using the collected information, dynamic marking manager 110 can provide insights of the data or media is identified to get the situational context. Once the situation manifestation is determined, dynamic marking manager 110 can determining an appropriate color of the paint. Dynamic marking manager 110 can then communicate with the electrochromic controller using Physical Network Function of 5G service programmability with the desired data (e.g., determined color instructions) to change the color of the road markings. In this embodiment, dynamic marking manager can alter existing lines to match with the determined color instructions. For example, where the received instructions calls to indicate safe overtaking maneuvers can be performed, dynamic marking manager 110 can alter an existing double solid line to one solid line and a dotted line on the side of the road where safe overtaking maneuvers can be performed. Stated another way, dynamic marking manager 110 matches the color with road color to dissolve the additional lines of the locations that simulates the change in the marking symbol. In some embodiments, dynamic marking manager 110 can revert road surface markings to a default or original state (e.g., where a default road surface marking is a solid double line, dynamic surface manager 110 can alter existing lines to indicate safe overtaking maneuvers can be performed, and when conditions are determined to be unsafe, revert the existing lines to their original or default configuration (e.g., double solid line).

In this embodiment, dynamic marking manager 110 can collect environmental data form weather database and other geographical information like hills, road slope information along with news feeds and accordingly leverage the received information to determine appropriate road markings and associated color changing instructions to execute the determined appropriate road markings.

Dynamic marking manager 110 can further collect additional information and identify additional electrochromic controllers by querying Physical Network Function of 5G network. In this embodiment, the PNF comprises Universally Unique Identifiers (UUIDs) for respective IoT devices. Information for these respective IoT devices are collected to same eNodeB. In this way, dynamic marking manager 110 can track IoT devices easier while altering road surface markings.

Once the PNF data is gathered at a Virtual Network Function and Programmability Framework, then dynamic marking manager 110 can generate and transmit signals using a shared DTCH created for all these devices. Dynamic marking manager 110 can then send appropriate road marking and color changing instruction is sent along with UUID of the sensor gathered from the PNF layers which essentially enables utilization of same DTCH shared across all the color changing devices in the eNodeB area. As the BCCH are limited in numbers, embodiments of the present invention create special purpose broadcast channels using bidirectional DTCH and gains operation speed. This reduces network requirement of the implementation and adds solution efficiency.

Accordingly, actuators on the electrochromic paint controller can receive the signal using DTCH and maps them with their UUIDs. In this embodiment, dynamic marking manager 110 can match the UUIDs and then change the color of the road surface markings are changed as per the received instructions from the 5G service orchestration control PDU.

Embodiments of the present invention recognize the following benefits this approach provides. For example, dynamic marking manager 110 can change road markers to indicate overtaking maneuvers are allowed when safe conditions are detected. Conversely, when unsafe conditions are detected, dynamic marking manager 110 can alter road markers to indicate that overtaking maneuvers, though normally allowed by static road markings, would not be allowed given unsafe conditions (e.g., heavy fog, rain, where visibility is impaired).

In another example, dynamic marking manager 110 can detect obstacles in the road (e.g., using one or more IoT devices and sensors embedded in electro chromatic controllers) and alter road markings to divert traffic. In this way, dynamic marking manager 110 can respond faster and route drivers and vehicles safely away from an obstacle.

Database 112 stores received information and can be representative of one or more databases that give permissioned access to dynamic marking manager 110 or publicly available databases. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
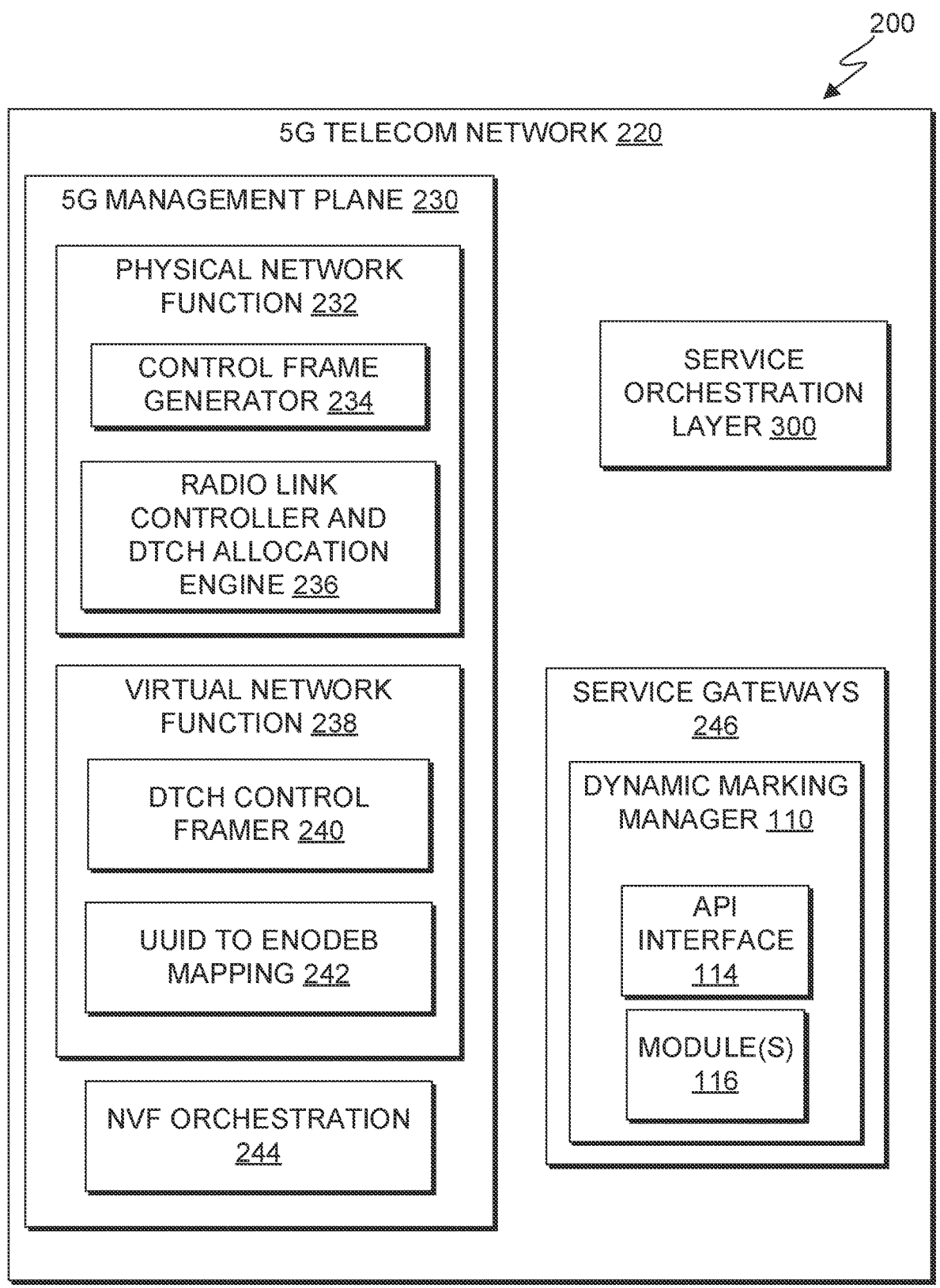
FIG. 2 depicts an alternate block diagram of a computing environment, in accordance with an embodiment of the present invention.

FIG. 2 depicts an alternate block diagram 200 of a computing environment, in accordance with an embodiment of the present invention.

Block diagram 200 illustrates a 5G telecommunications network (e.g., 5G telecom network 220). 5G telecom network 220 includes 5G management plane 230. 5G management plane 230 offers various features that serves as a base for service instances of embodiments of the present invention. In this embodiments, 5G network management plane 230 comprises physical and virtual network functions that deals with software defined networking capability offered in the small cell. In broad, 5G network management plane 230 manages the infrastructure that allows the RAN interface to talk to various entities using physical layer interface of PNF. Additionally, 5G network management plane 230 manages communication handling between the endpoint devices and the network interfaces that are used to send the logically sliced traffic to destination location (which is usually a service instance or could be edged or core cloud data movement). 5G management plane 230 includes physical network function 232, virtual network function 238, and NVF orchestration 244.

Physical network function 232 is PNF function which is responsible for connection management to endpoint devices over the radio interface. Each PFN takes care of bandwidth allocation at physical MAC interface layer to ensure that each logical slice is getting required network bandwidth and other characteristics like packet delay budgets. Physical network function 232 collects the packet flow and sends it over multiplexed S1 bearer so that it can be transmitted to the service instance. These PNFs are used to serve an eNodeB in the small cell coverage.

Physical network function 232 includes control frame generator 234 and radio link controller and DTCH allocation engine 236. Control frame generator 234 generates logic and selects the target understandable opcode in the common control frame structure. and create the common control channel (CCCH) frame so that it can be sent over the CCCH RAN interface channels to the devices. DTCH allocation engine 236 is logical channel controller engine which is a program running at the PNF and manages the logical slice bandwidth and activation-deactivation and channel management state machine for DTCH which is created between the endpoints to change the color of electrochromic interface targets.

Virtual network function 238 (e.g., VNF) are the virtualized platform for all the PNFs in the systems and offers a consolidated, virtualized view of underling physical network interfaces. In the 5G network, there could be many physically segregated cell's PNF and they will be virtualized to form a single view of overall networking subsystem at VNF interfaces. This typically performs translation of the logical channel to physical cell dependent entities that is further used to transfer the application packets.

NVF Orchestrator 244 is an abstraction layer for network virtualization layer functions in the upper layers of VNFs. These are orchestration framework that offers various set of APIs to perform general purpose actions on the network interfaces. This includes various query commands and other information exchange interfaces that are being used for insights articulations.

Virtual network function 238 includes DTCH control framer 240 and UUID to eNodeB mapping 242. DTCH control framer 240 is responsible form control instruction framing for the endpoints that need to be transferred over the radio interface. This is typically includes color, opacity and timelines for the restoration of the event in this case. DTCH control framer 240 collects the information from internal service instance and creates the target understandable frame with designated flags of color, road line type, opacity, and resolution timelines if any. UUID to eNodeB mapping 242 is a map which is maintained at eNodeB for identification of special purpose communication channel UUIDs so that the packet data and control frames can be pushed to all the channels at the same time. There can be multiple end-devices that needs activation trigger for color change of road lines, hence this caching map will be maintained at eNodeB.

5G telecom network 220 also includes service gateways 246. Service gateways 246 is service gateway which is a set of application program interfaces to collect additional information from external resources like geolocation services, news streams etc. The service gateway has the list of subscribed and authenticated services from which the input can be gathered. As these are authenticated interfaces by 5G's auth mechanisms, this offers trustable information from external resources. Service gateways 246 includes dynamic marking manager 110 (e.g., the service instance).

Dynamic marking manager 110 is wrapper function that decides the marking on the road lines (e.g. straight single or double and selects the start and end locations for the changes so that they can applied on remote devices on the road). Dynamic marking manager 110 includes API interface 114 and modules 116. API interface 114 includes the connectors to the repository where the external and internal data is resident. This will be used to get the required information when needed. Modules 116 includes one or more machine learning and artificial intelligence algorithms used to determine appropriate electrochromatic visualization displays.

5G telecom network 220 also includes service orchestration layer 300. Service orchestration layer 300 plays an important role by offering service deployment, monitoring and real time processing of the services deployed in this layer as discussed in greater detail with respect to FIG. 3.

Figure 3:
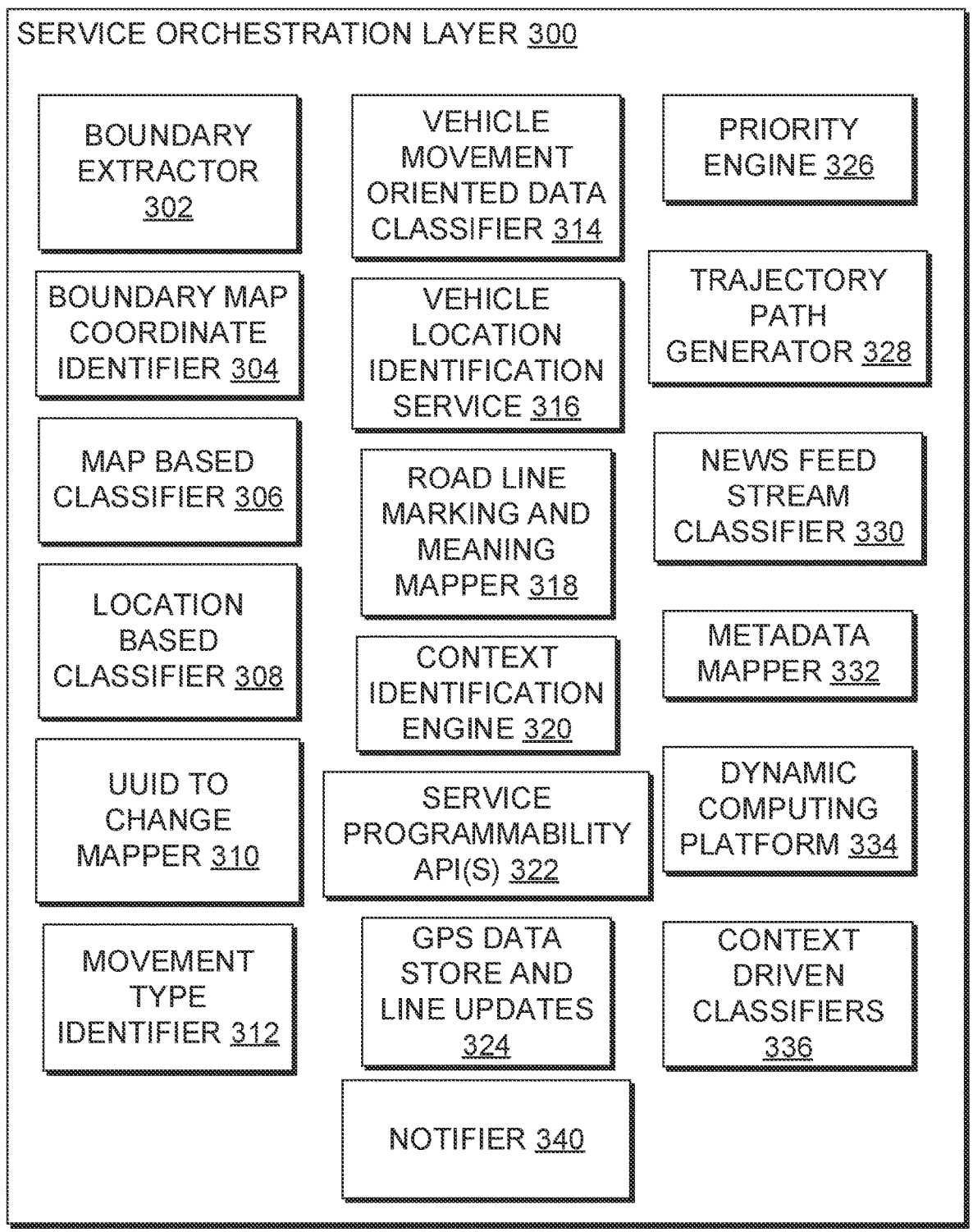
FIG. 3 depicts components of a service orchestration layer, in accordance with an embodiment of the present invention.

FIG. 3 depicts components of a service orchestration layer 300, in accordance with an embodiment of the present invention.

Service orchestration layer 300 houses all the application service instances running as part of a global 5G network. In this embodiment, service orchestration layer 300 includes boundary extractor 302, boundary map coordinate identifier 304, map based classifier 306, location based classifier 308, UUID to change mapper 310, movement type identifier 312, vehicle movement oriented data classifier 314, vehicle location identification service 316, road line marking and meaning mapper 318, context identification engine 320, service programmability APIs 322, priority engine 326, trajectory path generator 328, news feed stream classifier 330, metadata mapper 332, dynamic computing platform 334, context driver classifiers 336, and notifier 340.

Boundary extractor 302 gives the start and end location of road which is in the definition region of eNodeB which will be used while selecting the color and texture of the road lines by the invention.

Boundary map coordinate identifier 304 is map identifier that collects the data from 302 and prepares the map for the road lines where the dynamic electrochromism need to be applied based on the situations. Map based classifier 306 is a standard classification module that classifies the road for its condition (e.g., straight road, winding roads, road surface, etc. which would be an important classification needed to be considered while making the chromatic display (e.g., display)).

Location based classifier 308 is change tracker that is used to select the DTCH for the devices that needs change in color and opacity of electrochromic controller in order to change the road lines. Instead of sending color change notification to all, the invention calculates the diff and sends the trigger to selective devices to reduce radio transmission.

Movement type identifier 312 programs compute the device movement and identifies the speed and the direction of the vehicles. For example, where there are less vehicles on the road then the invention selectively selects the line-drawing based on location of the vehicle.

Vehicle movement oriented data classifier 314 is classification module that helps determining vehicle-oriented data like speed, type of vehicle etc. for consideration of more natural coding on road-lines.

Vehicle location identification service 316 is location-based service which is used to get the trajectory of the vehicle with current GPS location. This will be used to select PNF and VNF identities for color change instructions.

Road line marking and meaning mapper 318 is making mapper which keeps the current map of exact road line tracing and this will be used to calculate the difference when new markings need to be pushed.

Context identification engine 320 is context identification engine that gathers the input data and generates information insights for appropriate time-based road-line change and preservation.

Service programmability APIs 322 are service management APIs that handles device subscription, authentication of last mile delivery location aligns with vehicle identity and subscription based on implementation.

Priority engine 326 is tie breaking logic in the line selection. In case two lines types are selected, then 326 concludes the decision with its defined priority values. Trajectory path generator 328 estimates the path of the vehicle based on 308 and 312 so that the changes can be made proactively to the road-lines.

News feed stream classifier 330 are news channel collector and accordingly the outcomes are injected. For example, if a data stream (e.g., news report, user reported, or crowd-sourced generated information stream) says a big pothole observed near x location, then this data will be extracted to get the relevant drawings. Metadata mapper 332 are history mapping logic to get better results.

Dynamic computing platform 334 offers dynamic data delivery and triggering program that proactively polls for an external resources availability and validates the outcome proactively to get real time benefits. Context driver classifiers 336 are a context library that has predefined tags and line selector functions that are used to information insights. Notifier 340 is notification engine which sends endpoint notification and error notification for state changes during usual operation.

Figure 4:
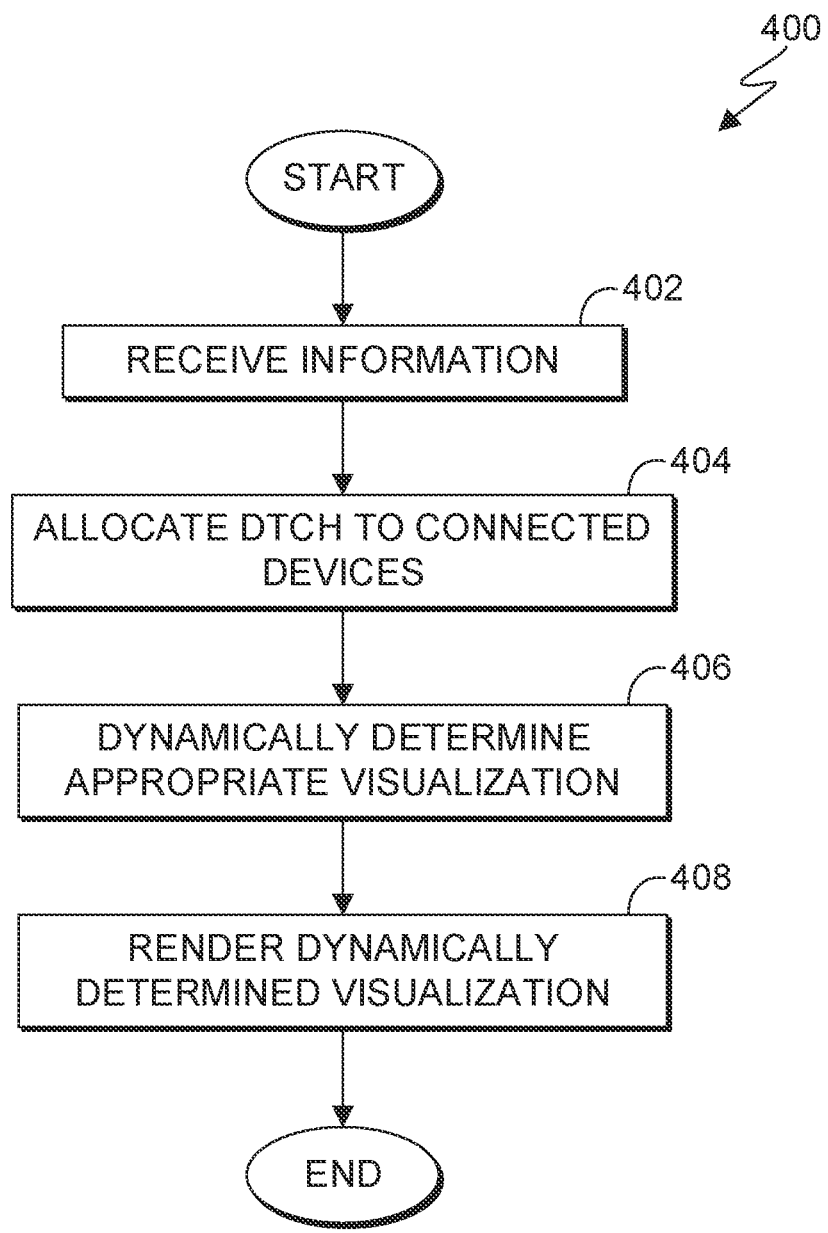
FIG. 4 is a flowchart depicting operational steps for generating dynamic electrochromic visualizations, in accordance with an embodiment of the present invention.
Figure 5:
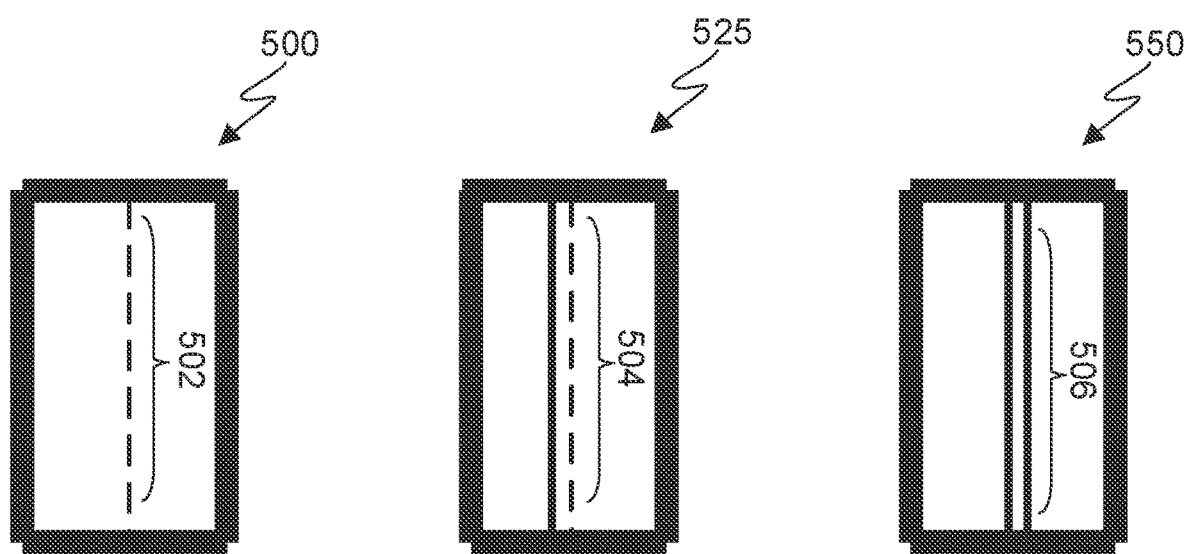
FIGS. 5A-C depict example images of dynamically generated electrochromic visualizations, in accordance with an embodiment of the present invention.

FIG. 4 is a flowchart 400 depicting operational steps for generating dynamic electrochromic visualizations, in accordance with an embodiment of the present invention.

In step 402, dynamic marking manager 110 receives information. In this embodiment, dynamic marking manager 110 receives a request from client computing device 102. In other embodiments, dynamic marking manager 110 can receive information from one or more other components of computing environment 100.

Information received by dynamic marking manager 110 refers to information pertaining to an area and navigation within the area. For example, dynamic marking manager 110 can receive information from one or more connected IoT devices (e.g., electrochromic paint controller of road markings, smart lights, etc.), one or more autonomous vehicles (e.g., that transmit sensor data that includes road imperfections, current speed, destination information, etc.), and one or more service applications (e.g., weather, crowdsource databases, etc.).

Types of information or data received can include current road conditions (e.g., current traffic levels for an area, road surface conditions (e.g., dry, wet, snow, etc.), road layouts (e.g., straight, constant radius curve, S curves, blind curves, banked curves, uphill curves, downhill curves, etc.). Dynamic marking manager 110 can also receive information that indicate road surface markings (e.g., solid white lines, solid yellow lines, dotted white or yellow lines, a solid line next to a dotted line) and their respective meanings (e.g., single lane roads, multilane, two-direction road, two-lane, two direction, no passing road, two-lane, two direct roads with some passing, two-direction road with a center turn lane, restricted lanes, reversible lanes, etc.). Information can also include weather information (e.g., current weather and forecasted weather) and can include other geographical information like hills, road slope information.

In this embodiment, dynamic marking manager 110 can optionally transmit a request to IoT connected devices within an area to send and register respective UUIDs. For example, dynamic marking manager 110 can request IoT devices such as electrochromic paint controllers responsible for road markings, autonomous vehicles information, or other user devices (e.g., smart phones) to connect the devices. In this embodiment, dynamic marking manager 110 collects and receives information to the same eNodeB.

In another embodiment, dynamic marking manager 110 can have two instances running: one instance running in the service orchestration layer of the 5G telecommunications network and another instance located on a road surface, integrated with an electro chromatic paint controller that is connected to painted road surface markings. In this embodiment, the electro chromatic paint controller is connected to the Physical Network Function layer of the 5G telecommunications network. In this embodiment, the service instance of dynamic marking manager 110 collects information from various device sensors and respective IoT devices and then allocate a low bandwidth DTCH from the service management platform by instruction the Virtual Network Function to negotiate for the bandwidth and allocate a dedicated logical channel over new radio for data transmission between IoT enabled devices.

In step 404, dynamic marking manager 110 allocates DTCH to connected devices. In this embodiment, dynamic marking manager 110 allocates a respective DTCH to connected devices. In this embodiment, dynamic marking manager 110 issues a Dedicated Traffic Channel (DTCH) that has a low bandwidth communication channel allocated over Radio bearers and uses MAC to transfer the control instructions to the device form the service orchestration layer. Once the DTHC is allocated, all the electrochromic controllers on the road will handshake using UUIDs and the UUIDs are stored as part of mapper objects in the Virtual Network Function of 5G network.

In this embodiment, the service instance of dynamic marking manager 110 can collect information streams from various data sources (e.g., IoT connected devices, public and permissioned databases, etc.) and accordingly classify the received information streams using serial or parallel stream classifiers.

In this embodiment, dynamic marking manager 110 can discern information insights based on the information collected by the stream data receivers. Dynamic marking manager 110 can use the allocated DTCH to collect vehicle location maps from the vehicle location service manager or location service monitoring daemon present as part of other vehicle control service in the orchestration plane.

In this embodiment, the service instance of dynamic marking manager 110 can collect additional information from one or more other services by invoking an in-bound API which then initiates a MAC based trajectory path request for all the vehicles in the area. In this embodiment, an in-bound approach of communication includes control framed of MAC (Media Access Control) protocol and dynamic marking manager 110 invokes an in-bound API across the common external data collector service in 5G domain wherein the static platform data can be accessed. In this way, dynamic marking manager 110 can collect static data that includes platform identification, hardware specification and model internal architecture is collected from the MAC based service interconnect manager. Examples of static data can include supported speed, number of pistons, hardware default settings, etc.). Dynamic marking manager 110 can then parse the collected information using a regex-based document classifier and saved in metadata mappers.

In step 406, dynamic marking manager 110 dynamically determines appropriate visualization. In this embodiment, dynamic marking manager 110 dynamically determines appropriate visualization based on received information using a combination of machine learning and artificial intelligence algorithms. For example, dynamic marking manager 110 can determine an appropriate visualization based on received vehicle trajectory maps, member data classification mappers and the location insights articulated. Dynamic marking manager 110 can the transmit the dynamically determined appropriate visualization to the Virtual Network Function which then maps the location of the actuator color chaining controller using UUID and maps received from the orchestration service. Then, dynamic marking manager 110 can actuate the Physical Network Function functions based on the detected eNodeB for which the road line marking change is needed.

In another embodiment, dynamic marking manager 110 can assign weight values to received information to generate a safety score. In this embodiment, a safety score indicates a threshold level of safety that indicates overtaking maneuvers can be performed. For example, in this embodiment, dynamic marking manager 110 uses a numeric scale where greater numbers indicate a higher risk while lower numbers indicate a lesser risk. Specifically, in this embodiment, where the scale is from zero to one hundred, a risk score of ninety indicates a higher risk than a risk score of ten.

In this embodiment, dynamic marking manager 110 has three different threshold values for safety. For example, a no risk to low risk category denotes overtaking maneuvers are permissible (e.g., a risk score of ten or under in a numeric scale ranging from zero to one hundred). Conversely, a high risk score denotes overtaking maneuvers are not permissible (e.g., a risk score of ninety and above). Scores above ten and below ninety indicate a medium risk. In other embodiments, the safety threshold can be configured to any desired threshold.

In scenarios where dynamic marking manager 110 determines a no to low risk safety score, dynamic marking manager 110 can identify an appropriate road marking configuration associated with permissible overtaking. For example, dynamic marking manager 110 can identify that a default road marking is a double solid line that indicates a two-lane, two direction, and no passing road. Dynamic marking manager 110 can then determine there is a low risk safety score (e.g., a risk score of ten or less based on the number of drivers and associated vehicles traveling in the direction opposite of for drivers on one side of the road, current road surface conditions, number of drivers and vehicles traveling in the same direction of drivers wanting to perform overtaking procedures, current speed of vehicles, etc.). Dynamic marking manager 110 can then determine the appropriate visualization as maintaining one side of the solid line and changing the solid line closest to the vehicles that would be performing an overtaking maneuver to a dotted solid line to indicate that passing is permitted.

In some embodiments, dynamic marking manager 110 can dynamically determine appropriate visualization based on obstacles detected in the road and road congestion. For example, dynamic marking manager 110 can detect an obstacle present one of the lanes of a two lane, two direction road with a center turn lane. In this scenario, in response to determining an obstacle is present in one of the lanes of a two lane, two direction road, dynamic marking manager 110 can determine an appropriate visualization that directs traffic away from the obstacle and can optionally convert the center lane into a lane for vehicles to use to get around the detected obstacle.

In scenarios where dynamic marking manager 110 alters the road markers based on the safety score (e.g., reaches or exceeds a threshold value for safety), obstacles on the road, and road congestion, dynamic marking manager 110 can return (i.e., revert) the road surface marking to the default road markers after safety conditions, obstacles, or road congestion return to baseline threshold values (e.g., medium risk). Continuing the example above, after the detected obstacle has been removed, dynamic marking manager 110 can transmit instructions to return the road markings to default, that is, return the road markings to display the center line markings.

In step 408, dynamic marking manager 110 renders the dynamically determined visualization. In this embodiment, dynamic marking manager 110 renders the dynamically determined visualization by transmitting instructions to respective electro chromatic controllers of the road markings to initiate the necessary voltage to change the road surface markings. For example, dynamic marking manager 110 generates a DTCH broadcast message using the Physical Network Function (that has embedded UUIDs for all controllers which need the change in the color of road surface markings) and accordingly transmits the DTCH broadcast messages that includes the instructions to change color over the radio bearer. Accordingly, upon reception of the broadcast message over the dedicated electrochromic DTCH on the controller, the color code is identified based on UUID mapping and the road strips are changed accordingly.

FIGS. 5A-C depict example images of dynamically generated electrochromic visualizations, in accordance with an embodiment of the present invention.

FIG. 5A depicts example image 500. Example image 500 is representative of a road and associated road markings of the road in its default state, that is, the road markings that were intended to be displayed based guidelines set forth by appropriate highway and safety committees. In this example, road marking 502 denotes a single, dotted line which is representative of a road marking that allows users to perform overtaking maneuvers.

FIG. 5B depicts example image 525. Example image 525 is representative of the same road as depicted in example image 500 of FIG. 5A; however, dynamic marking manager 110 has detected a high risk safety score for drivers left of the solid line. Accordingly, in this example, dynamic marking manager 110 determines the appropriate road surface marking as adding a solid line left of the dotted line (as denoted by road marking 504) to alert drivers and respective vehicles that it is unsafe to pass with respect to the direction of traffic closest to the solid line.

FIG. 5C depicts example image 550. Example image 550 is representative of the same road as depicted in example 500 of FIG. 5A; however, dynamic marking manager 110 has detected a high risk safety score for drivers on both sides of road marking. Accordingly, in this example, dynamic marking manager 110 determines the appropriate road surface marking to be a double solid line (as denoted by road marking 506) indicating that it is unsafe to pass.

Figure 6:
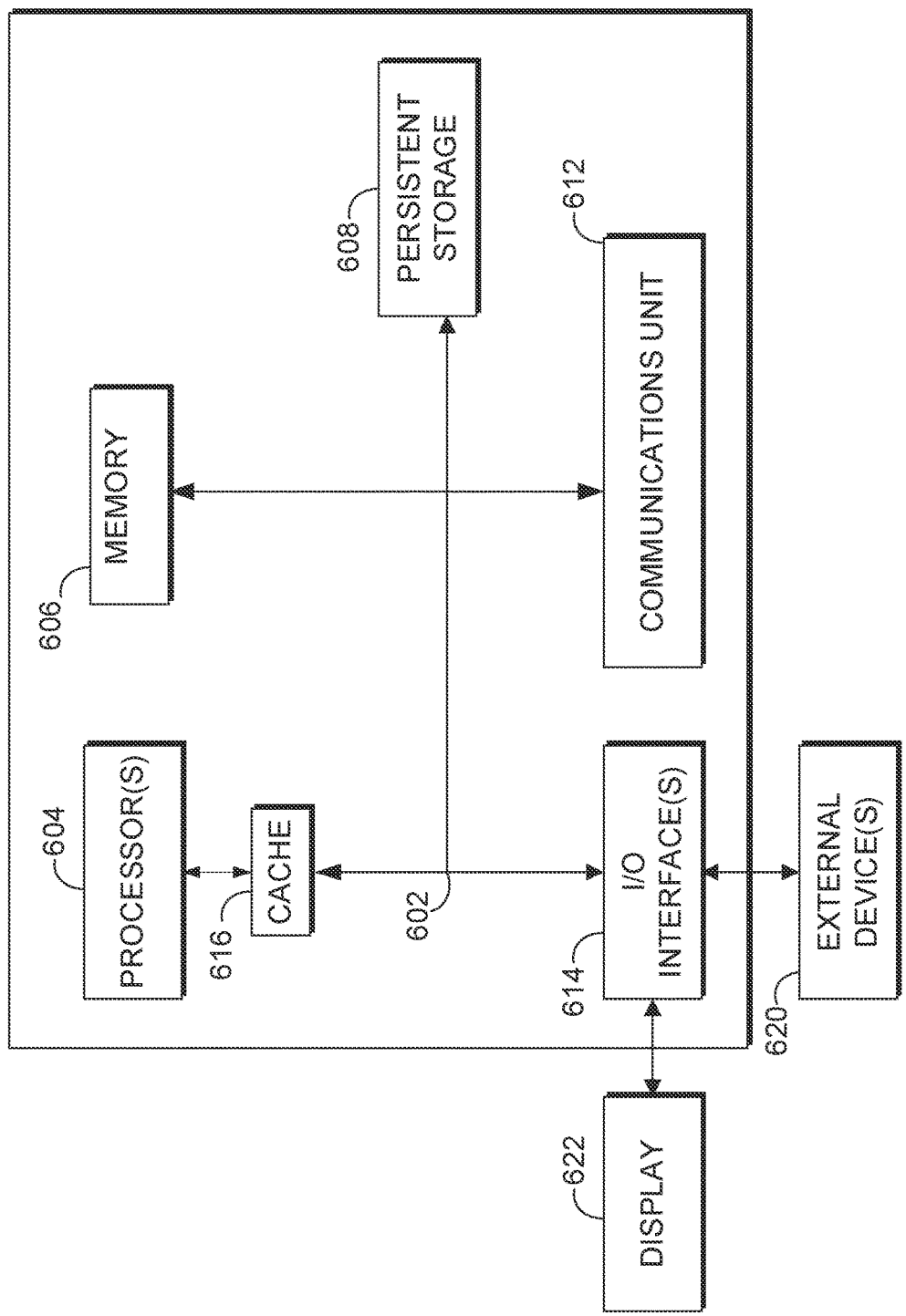
FIG. 6 is a block diagram of an example system, in accordance with an embodiment of the present invention.

FIG. 6 depicts a block diagram of components of computing systems within computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 600 includes communications fabric 602, which provides communications between cache 616, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Dynamic marking manager 110 (not shown) may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. Dynamic marking manager 110 may be downloaded to persistent storage 508 through communications unit 612.

I/O interface(s) 614 allows for input and output of data with other devices that may be connected to client computing device and/or server computer. For example, I/O interface 614 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards. Software and data used to practice embodiments of the present invention, e.g., dynamic marking manager 110, can be stored on such portable computer readable storage media and can be loaded onto persistent storage 608 via I/O interface(s) 614. I/O interface(s) 614 also connect to a display 622.

Display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    allocating a dedicated traffic channel to a plurality of connected devices;
    dynamically determining an appropriate visualization for one or more connected devices of the plurality of connected devices based on received information; and
    rendering the dynamically determined appropriate visualization for the one or more connected devices of the plurality of connected devices using the dedicated traffic channel via an electrochromatic paint controller embedded within the one or more connected devices.

2. The computer-implemented method of claim 1, further comprising:
    collecting information from the plurality of connected devices using the allocated, dedicated traffic channel.

3. The computer-implemented method of claim 1, further comprising:
    reverting the dynamically determined appropriate visualization to a default visualization.

4. The computer-implemented method of claim 1, wherein at least one connected device of the plurality of connected devices is an electro chromatic controller connected to a painted surface.

5. The computer-implemented method of claim 1, wherein an appropriate visualization is a road marking associated with directional information, permissible activity, or non-permissible activity.

6. The computer-implemented method of claim 1, wherein dynamically determining an appropriate visualization for one or more connected devices of the plurality of connected devices based on received information comprises:
    assigning weight values to received information; and
    determining a level of risk associated with a maneuver to be performed by a vehicle based on the assigned weight values.

7. The computer-implemented method of claim 6, further comprising:
    in response to determining that the level of risk associated with the maneuver to be performed by the vehicle reaches a threshold value for safety, altering road surface markings to reflect the maneuver is permitted.

8. A computer program product comprising:
    one or more computer readable storage media and program instructions stored on the one or more computer readable storage media, the program instructions comprising:
    program instructions to allocate a dedicated traffic channel to a plurality of connected devices;
    program instructions to dynamically determine an appropriate visualization for one or more connected devices of the plurality of connected devices based on received information; and
    program instructions to render the dynamically determined appropriate visualization for the one or more connected devices of the plurality of connected devices using the dedicated traffic channel via an electrochromatic paint controller embedded within the one or more connected devices.

9. The computer program product of claim 8, wherein the program instructions stored one the one or more computer readable storage media further comprise:
program instructions to collect information from the plurality of connected devices using the allocated, dedicated traffic channel.

10. The computer program product of claim 8, wherein the program instructions stored one the one or more computer readable storage media further comprise:
program instructions to revert the dynamically determined appropriate visualization to a default visualization.

11. The computer program product of claim 8, wherein at least one connected device of the plurality of connected devices is an electro chromatic controller connected to a painted surface.

12. The computer program product of claim 8, wherein an appropriate visualization is a road marking associated with directional information, permissible activity, or non-permissible activity.

13. The computer program product of claim 8, wherein the program instructions to dynamically determine an appropriate visualization for one or more connected devices of the plurality of connected devices based on received information comprise:
program instructions to assign weight values to received information; and
program instructions to determine a level of risk associated with a maneuver to be performed by a vehicle based on the assigned weight values.

14. The computer program product of claim 13, wherein the program instructions stored one the one or more computer readable storage media further comprise:
program instructions to, in response to determining that the level of risk associated with the maneuver to be performed by the vehicle reaches a threshold value for safety, alter road surface markings to reflect the maneuver is permitted.

15. A computer system comprising:
one or more computer processors;
one or more computer readable storage media; and
program instructions stored on the one or more computer readable storage media for execution by at least one of the one or more computer processors, the program instructions comprising:
program instructions to allocate a dedicated traffic channel to a plurality of connected devices;
program instructions to dynamically determine an appropriate visualization for one or more connected devices of the plurality of connected devices based on received information; and
program instructions to render the dynamically determined appropriate visualization for the one or more connected devices of the plurality of connected devices using the dedicated traffic channel via an electrochromatic paint controller embedded within the one or more connected devices.

16. The computer system of claim 15, wherein the program instructions stored one the one or more computer readable storage media further comprise:
program instructions to collect information from the plurality of connected devices using the allocated, dedicated traffic channel.

17. The computer system of claim 15, wherein the program instructions stored one the one or more computer readable storage media further comprise:
program instructions to revert the dynamically determined appropriate visualization to a default visualization.

18. The computer system of claim 15, wherein at least one connected device of the plurality of connected devices is an electro chromatic controller connected to a painted surface.

19. The computer system of claim 15, wherein an appropriate visualization is a road marking associated with directional information, permissible activity, or non-permissible activity.

20. The computer system of claim 15, wherein the program instructions to dynamically determine an appropriate visualization for one or more connected devices of the plurality of connected devices based on received information comprise:
program instructions to assign weight values to received information; and
program instructions to determine a level of risk associated with a maneuver to be performed by a vehicle based on the assigned weight values.

* * * * *